United States Patent
Greenberg (12)

(10) Patent No.: US 6,891,671 B1
(45) Date of Patent: May 10, 2005

(54) APPARATUS AND METHODS FOR CREATING REAL-TIME 3-D IMAGES AND CONSTRUCTING 3-D MODELS OF AN OBJECT IMAGED IN AN OPTICAL SYSTEM

(76) Inventor: Gary Greenberg, 520 Washington Blvd. #422, Marina Del Rey, CA (US) 90292

( * ) Notice: Subject to any disclaimer, the term of this patent is extended or adjusted under 35 U.S.C. 154(b) by 0 days.

(21) Appl. No.: 09/552,180

(22) Filed: Apr. 18, 2000

(51) Int. Cl.[7] .................... G02B 21/06; G02B 21/00
(52) U.S. Cl. ................. 359/388; 359/368; 359/385
(58) Field of Search ................. 359/368–390, 359/738–740, 227–236

(56) References Cited

U.S. PATENT DOCUMENTS

| | | | | |
|---|---|---|---|---|
| 1,924,700 A | * | 8/1933 | Thilo ...................... 348/199 |
| 3,671,754 A | * | 6/1972 | Mundkur ................. 250/236 |
| 4,407,569 A | * | 10/1983 | Piller et al. .............. 359/370 |
| 4,413,889 A | * | 11/1983 | Taira ...................... 359/362 |
| 4,561,731 A | * | 12/1985 | Kley ........................ 349/1 |
| 4,836,667 A | * | 6/1989 | Ozeki ...................... 359/389 |
| 4,852,985 A | * | 8/1989 | Fujihara et al. .......... 359/387 |
| 4,902,115 A | * | 2/1990 | Takahashi ................ 359/362 |
| 4,927,254 A | * | 5/1990 | Kino et al. .............. 359/235 |
| 5,148,233 A | * | 9/1992 | Imamura et al. ......... 356/243.1 |
| 5,168,157 A | * | 12/1992 | Kimura .................... 250/225 |
| 5,299,053 A | * | 3/1994 | Kleinburg et al. ........ 359/227 |
| 5,351,152 A | * | 9/1994 | Kuo et al. ................ 359/234 |
| 5,706,128 A | * | 1/1998 | Greenberg ................ 359/385 |
| 5,835,264 A | * | 11/1998 | Tandler et al. ........... 359/377 |
| 6,020,993 A | * | 2/2000 | Greenberg ................ 359/363 |
| 6,028,306 A | * | 2/2000 | Hayashi .................... 250/235 |
| 6,038,067 A | * | 3/2000 | George .................... 359/368 |
| 6,646,819 B2 | * | 11/2003 | Greenberg ................ 359/738 |
| 6,657,796 B2 | * | 12/2003 | Greenberg ................ 359/738 |

FOREIGN PATENT DOCUMENTS

DE    34 09 657    *    9/1985    ................ 359/387

* cited by examiner

*Primary Examiner*—Thong Q. Nguyen
(74) *Attorney, Agent, or Firm*—H. Michael Brucker

(57) ABSTRACT

Dynamic aperture microscopy in which the portion of an objective aperture that passes light in an optical system that images an object is continuously changed to create motion parallax which continuously changes the angle from which the object is viewed to create a moving 3-D view of the object from which a 3-D model of the object can be constructed that can be seen or measured from any angle.

43 Claims, 12 Drawing Sheets

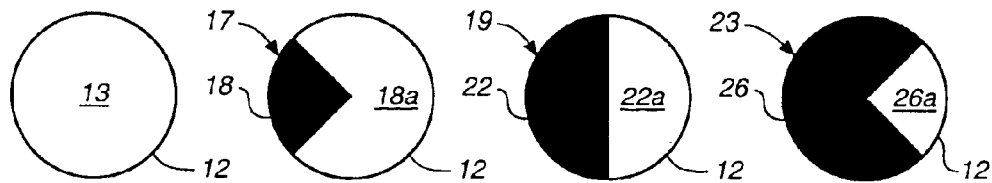
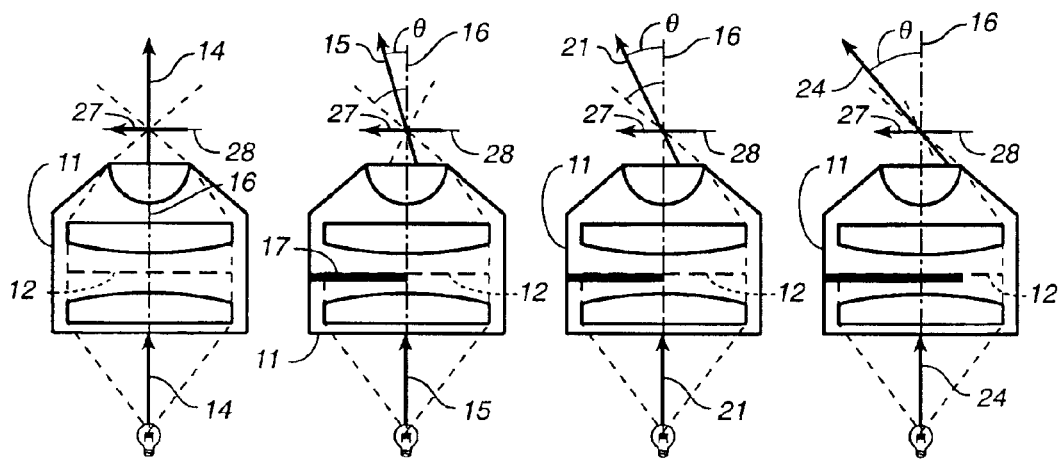
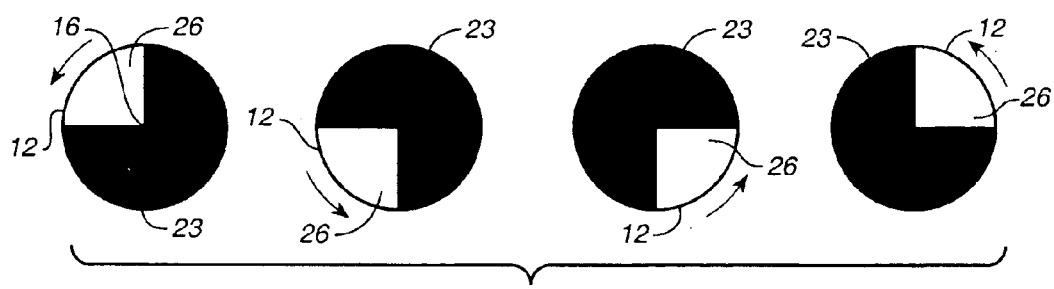
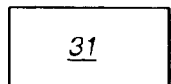

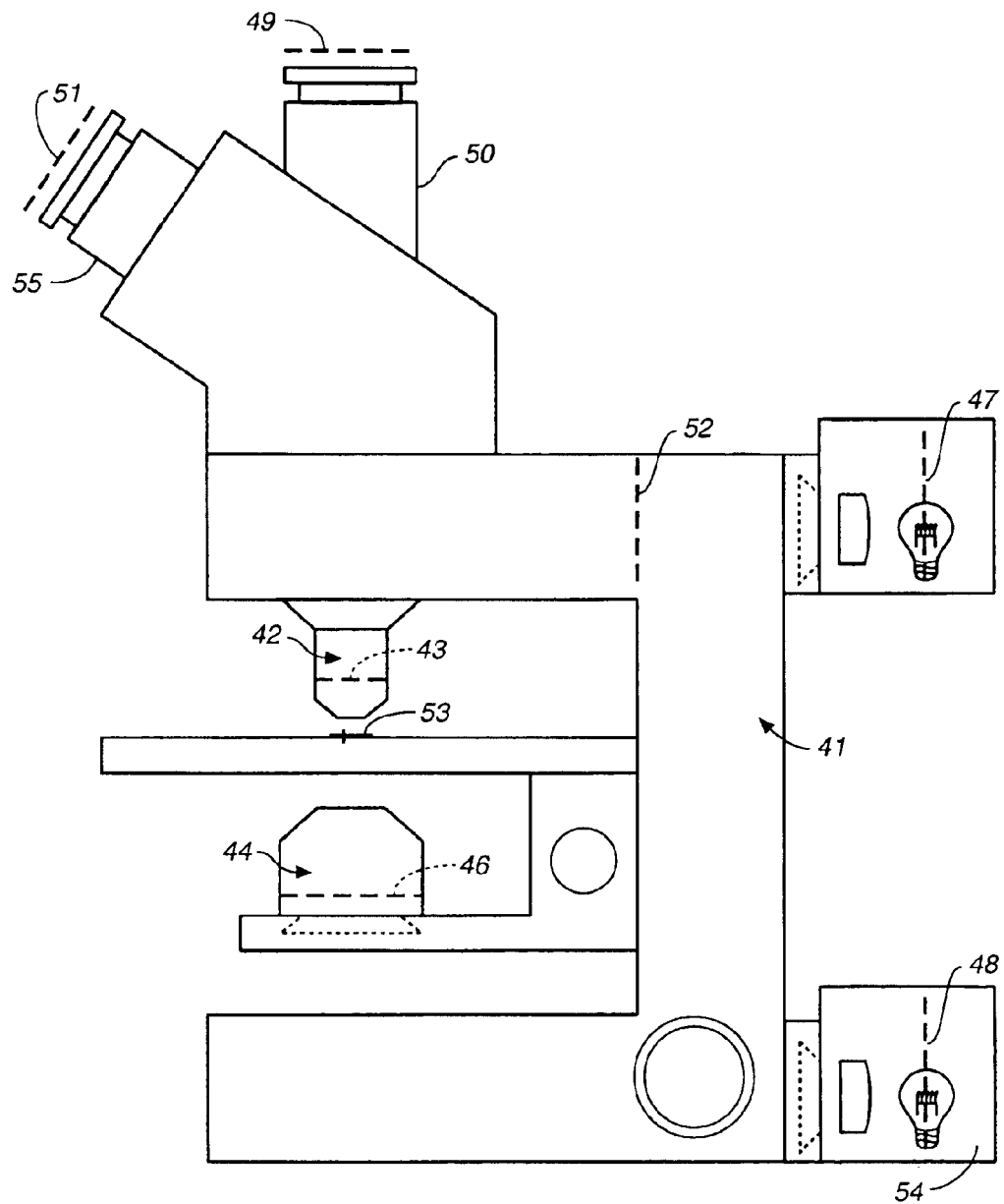
FIG._6
*(PRIOR ART)*

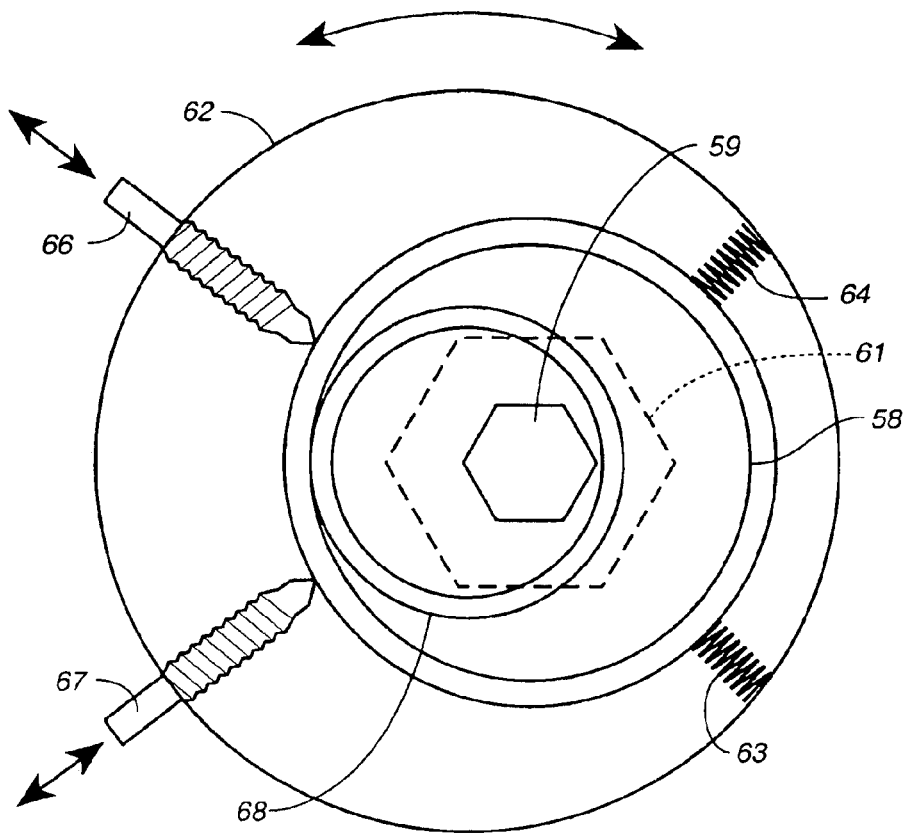
FIG._7
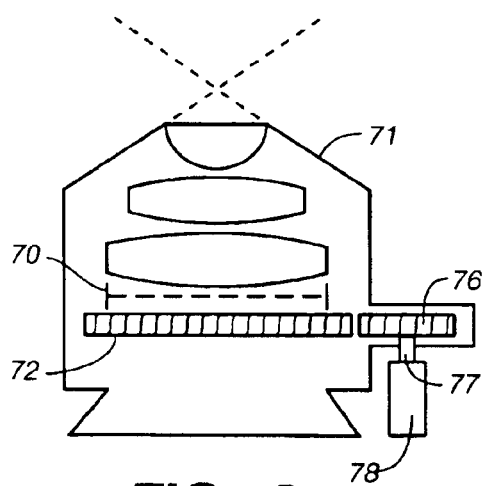
FIG._8
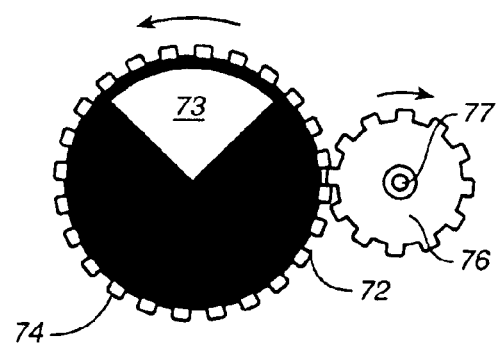
FIG._8a

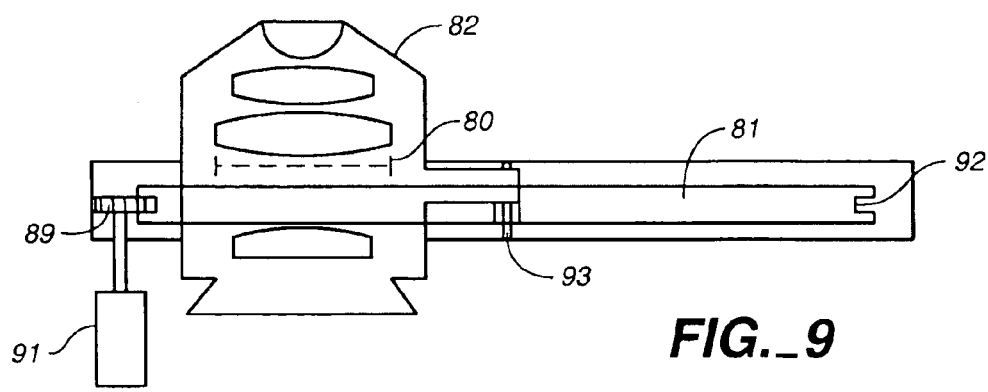
FIG._9
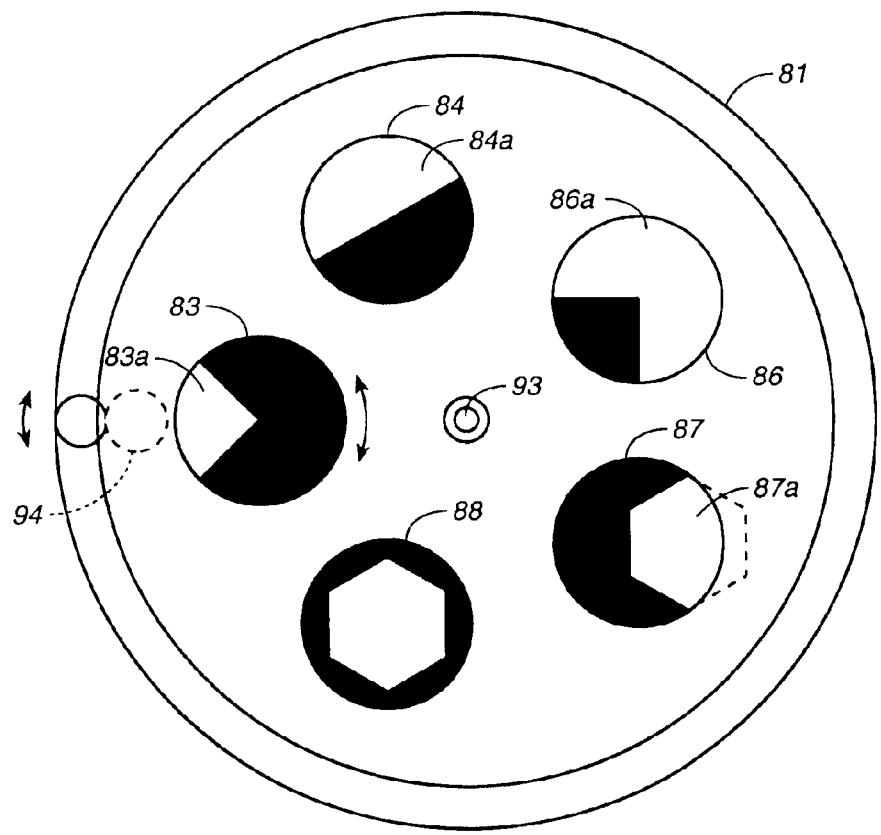
FIG._9a

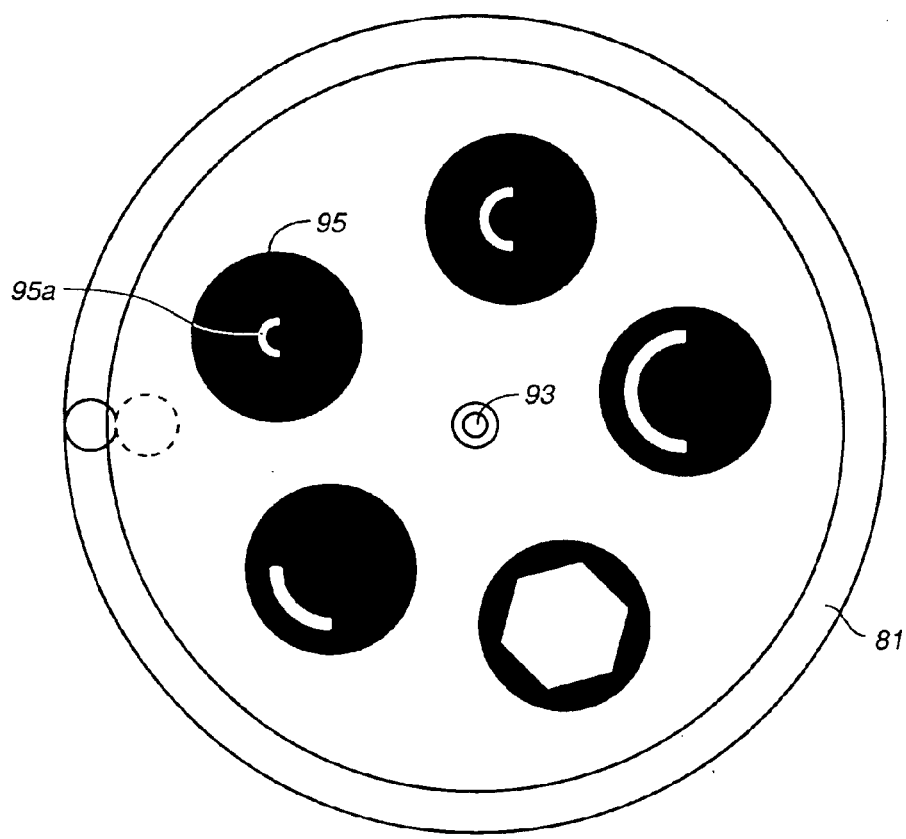
FIG._9b
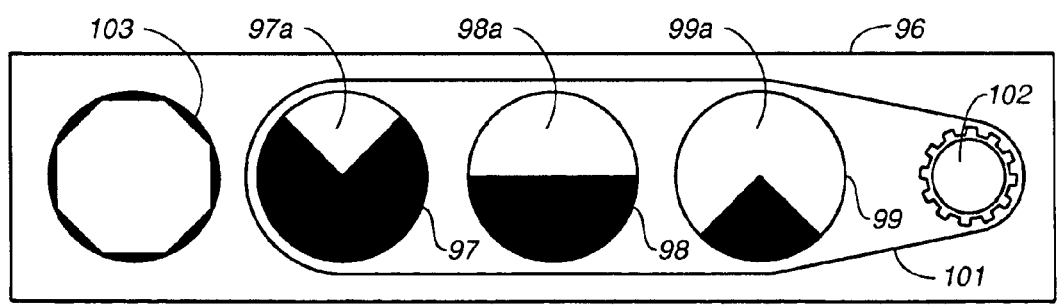
FIG._10

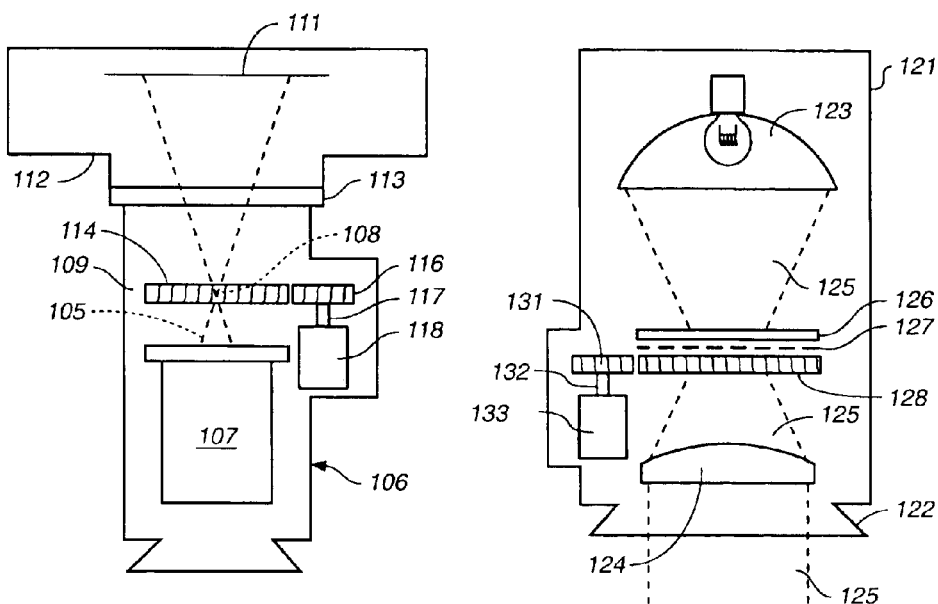
FIG._11  FIG._12
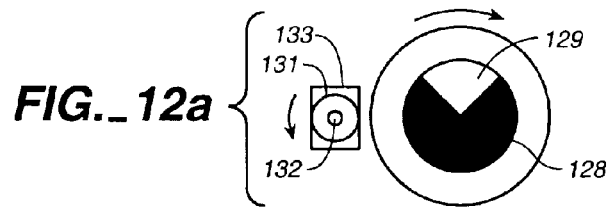
FIG._12a
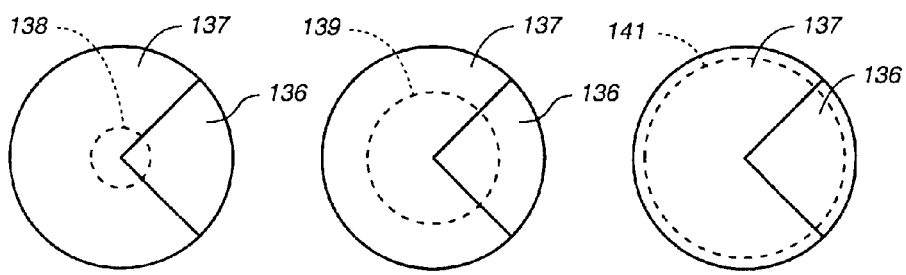
FIG._13a  FIG._13b  FIG._13c

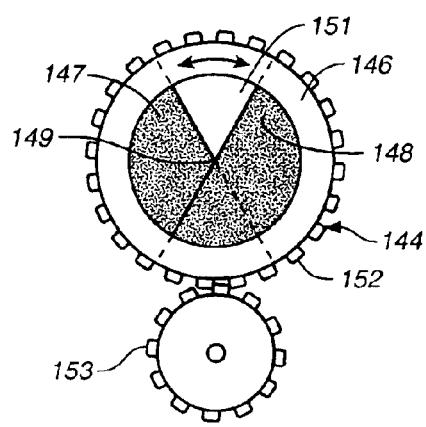
FIG._14a
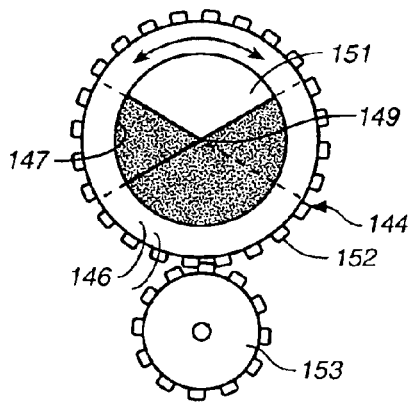
FIG._14b
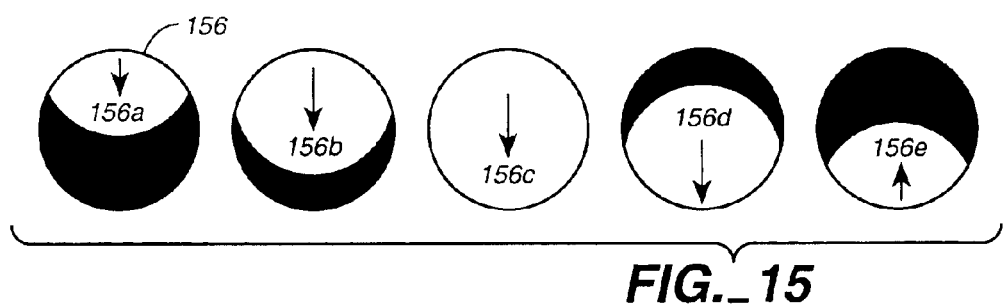
FIG._15
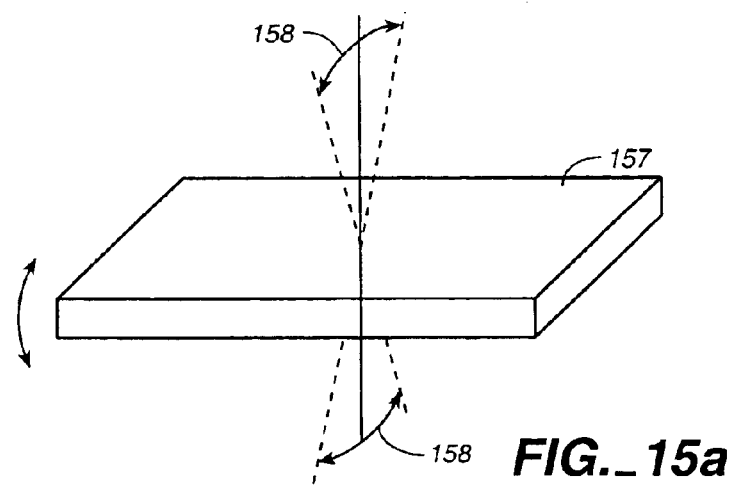
FIG._15a

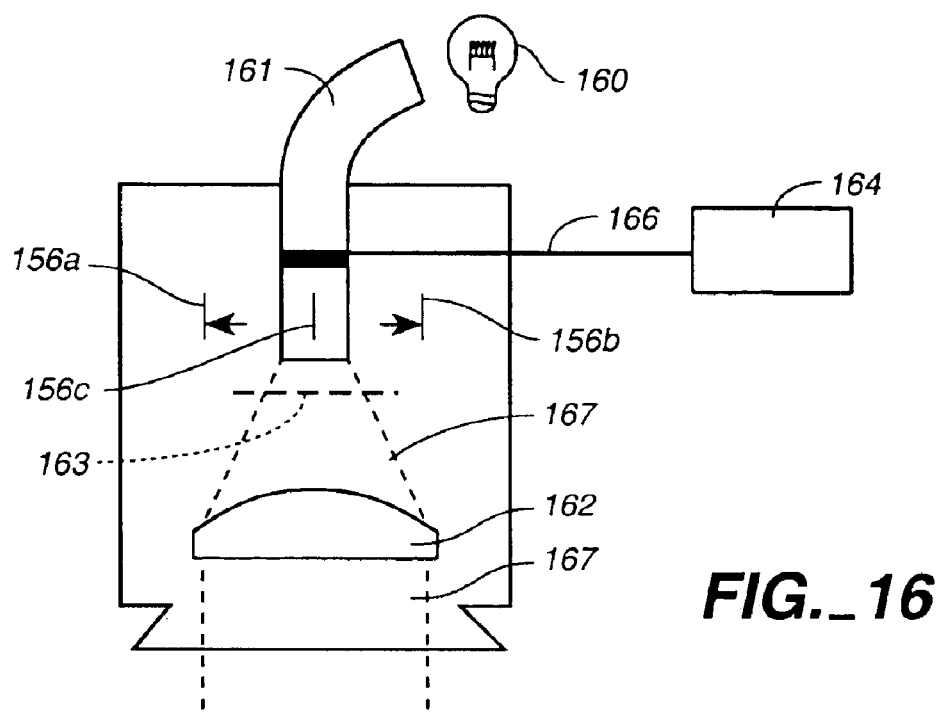
FIG._16
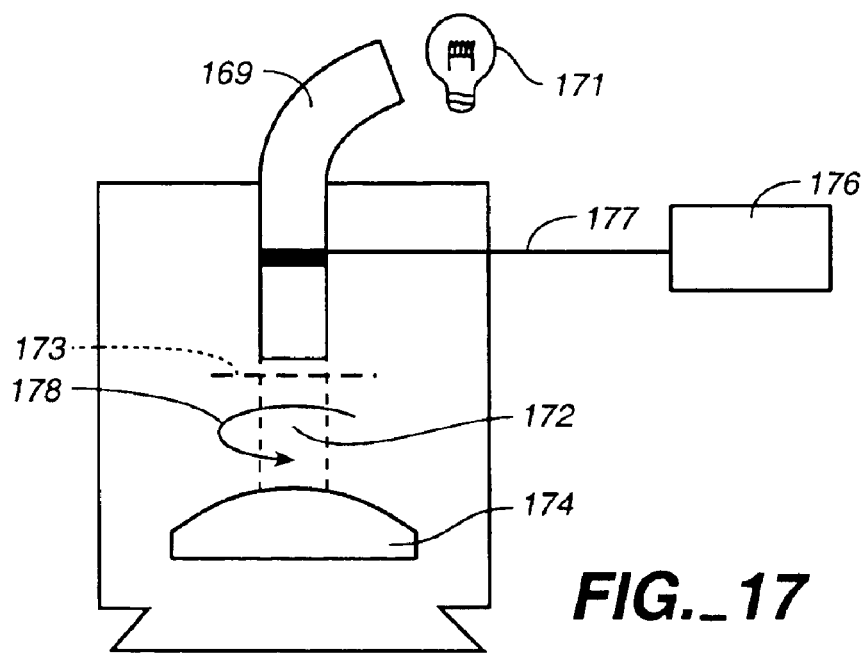
FIG._17

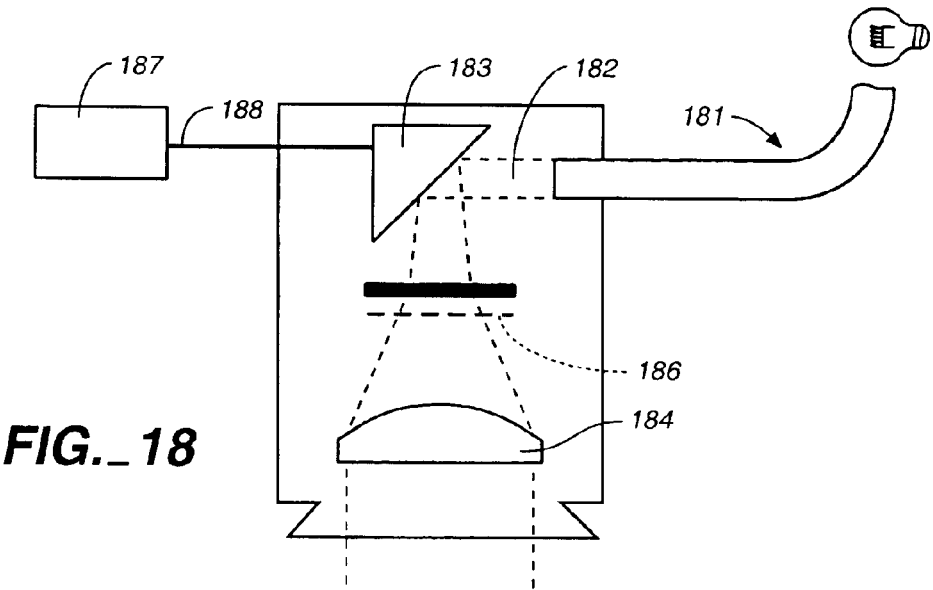
FIG._18
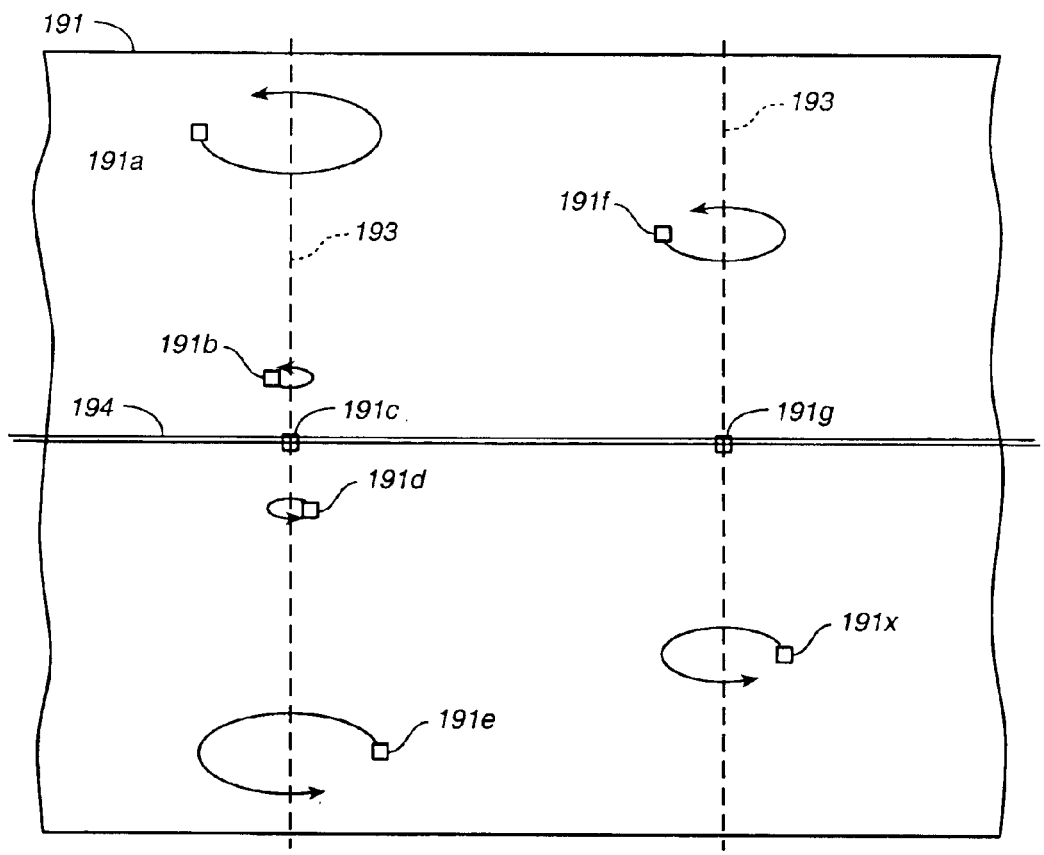
FIG._19

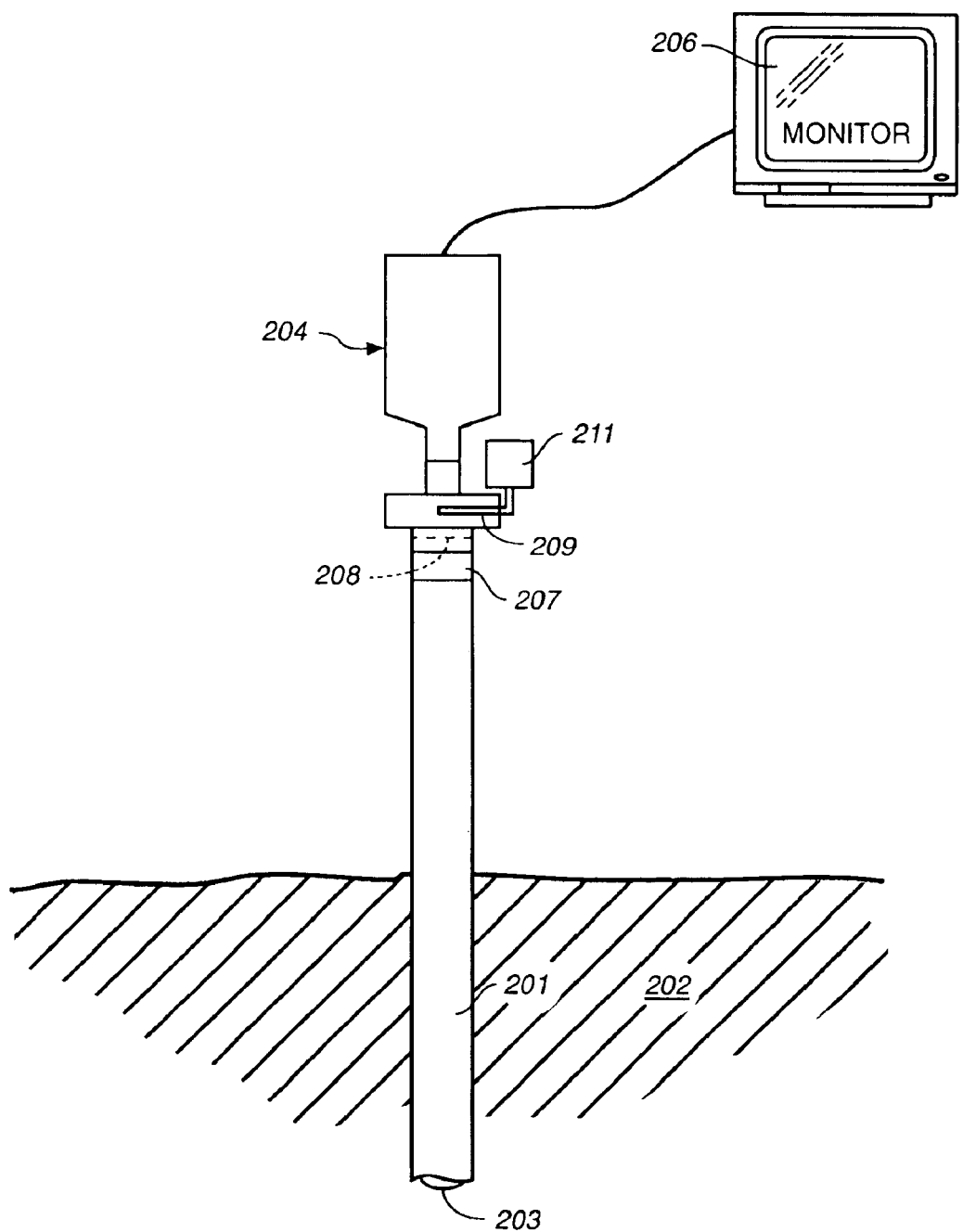
FIG._20

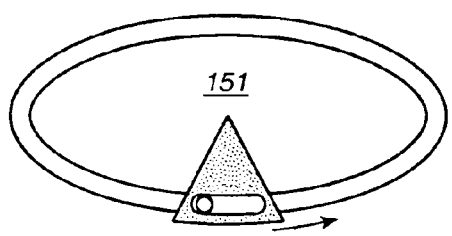
FIG._21
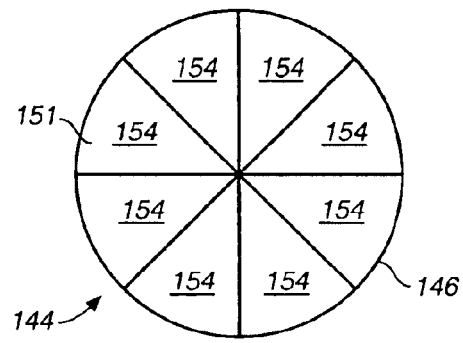
FIG._23a
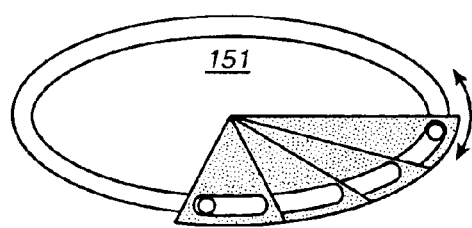
FIG._21a
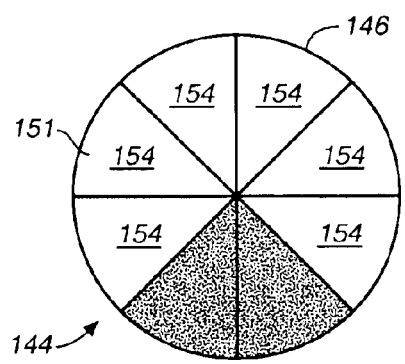
FIG._23b
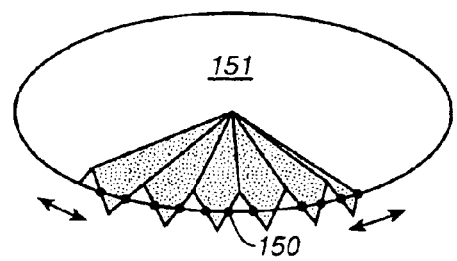
FIG._22
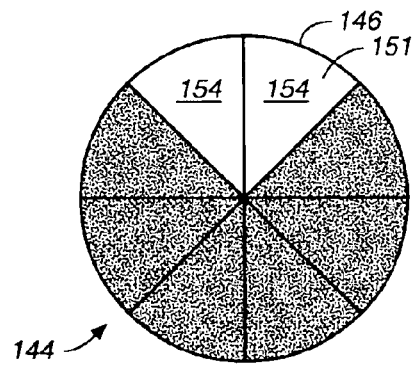
FIG._23c

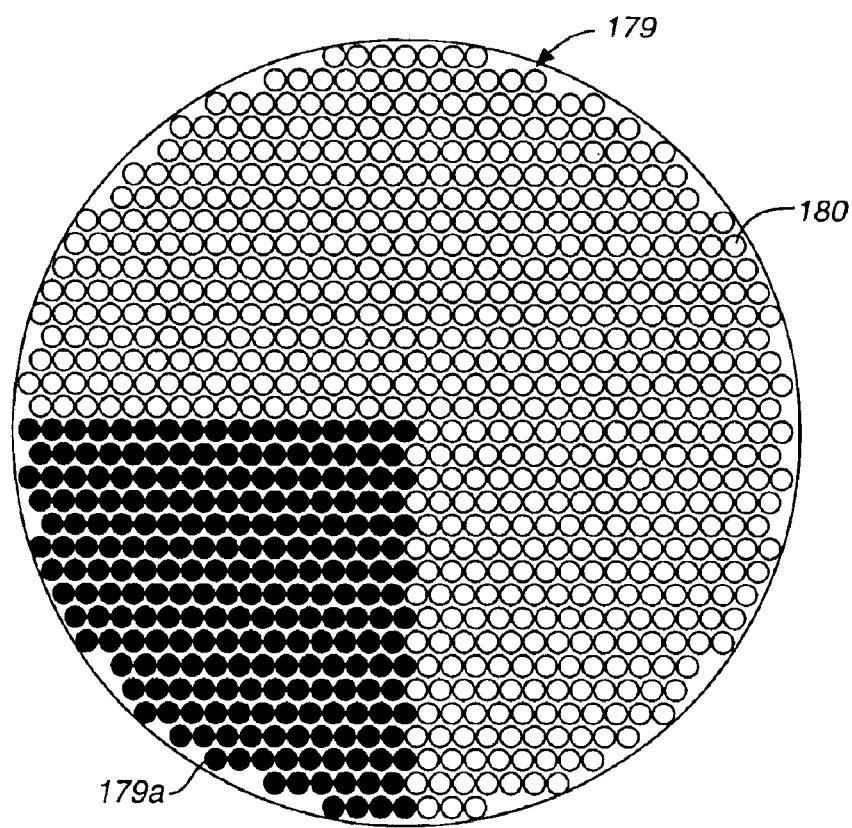
FIG._24

APPARATUS AND METHODS FOR CREATING REAL-TIME 3-D IMAGES AND CONSTRUCTING 3-D MODELS OF AN OBJECT IMAGED IN AN OPTICAL SYSTEM

FIELD OF THE INVENTION

The present invention relates to optical systems, and more particularly, to methods and apparatus for creating and capturing perceivable 3-D images of an object and constructing 3-D models of the object that can be viewed and measured from any angle.

BACKGROUND OF THE RELATED ART

Based on the state of the art prior to the present invention, the creation of a viewable 3-D image of an object in an optical system, such as a microscope, requires the use of filters, dual imaging systems or expensive viewing optics, all of which have their known disadvantages. The prior art has used the notion of convergence parallax or stereoscopic viewing from two angles simultaneously. In the present invention, we teach the use of motion parallax to create a perceivable 3-D image.

Prior to the present invention, it has not been possible to view an object in real-time 3-D through a standard microscope by the addition of a relatively inexpensive add-on device or to create a tomographic model of an object using such a device.

SUMMARY OF THE INVENTION

The present invention teaches methods and apparatus for obtaining 3-D images of an object in a standard microscope by continuously changing the angle from which the image of the object is viewed. "View", "viewing" and "viewed" as used throughout this specification refer to detection of an image by either the human eye or an optical or electronic device or system.

A typical optical system for creating the image of an object, such as a microscope, includes one or more aperture planes conjugate to the objective lens aperture, such as the condenser lens aperture, the light source of the system, the eye-point of the eyepiece (or barlow lens) or any conjugate relayed aperture plane that uses relay lenses. When used herein, "objective aperture" refers to the objective lens aperture and any aperture at a plane conjugate to the objective lens aperture.

The present invention teaches that by selecting an objective aperture in either the illumination path or the viewing path of a light transmitting optical system and continuously changing the portion of that objective aperture through which the light passes, motion parallax is created. To the viewer, the image of the object is continuously moving in a way that makes the foreground elements of the image distinguishable from the background elements. In this way, the image appears to the viewer in 3-D without the need for any viewing aids, such as special 3-D spectacles or filters. In fact, with the present invention, 3-D perception is even created in microscopes having only a monocular viewing head.

When the portion of the selected objective aperture that passes light is continuously changed, as, for example, by rotating an off-centered opaque mask having an aperture (mask aperture) at an objective aperture, the image of the object will appear to move in an inclined rotary motion, distinguishing the elements of the image in the foreground from those in the background.

If the portion of the selected objective aperture that passes light is continuously changed by a back and forth motion of a mask aperture in the y-axis, then the image appears to rock back and forth. If the back and forth motion is in the x-axis, then the image will appear to roll from left to right.

The shape of the moving mask aperture will determine image properties, such as depth of field, definition (highlighting and shadowing effects), contrast, resolution and parallax angle differences. The present invention provides for control of image properties by selecting different shapes and sizes for dynamic mask apertures. The dynamic mask apertures can be physical openings in otherwise opaque members or other means of occluding light, such as LCD shutter mechanisms, and can be inserted or removed from the light path as required.

In addition to a dynamic mask aperture for continuously changing the portion of a selected objective aperture that passes light, the advantages of the present invention are also achieved by continuously moving a shaped light beam at a selected objective aperture so that the portion of the aperture which passes light is continuously changed. A "shaped beam" as used herein means a light beam that is shaped such that it fills less than the entire objective aperture and as used herein includes, without limitation, masked beams, focused beams and an array of light-emitting diodes (LEDs). By locating an array of LEDs at an objective aperture (such as a condenser lens aperture) and stimulating different ones of the LEDs in a timed sequence, it is possible, using known techniques, to continuously change the portion of the objective aperture that passes light. In such a case, the LED array is both the shaped beam and the light source.

Regardless of the particular motion generated or the particular structures used to continuously change the portion of a selected objective aperture that passes light, the continuously moving image created distinguishes the relative positions of the elements of the object and the object can be detected in 3-D by continuously interrogating the object from different points of view.

When the objective aperture is in the illumination part of the system, the benefits of oblique illumination are also imparted to the image.

Because the invention can be applied to an objective aperture in either the illumination or viewing paths of an optical system, the present invention is useful in systems using transmitted illumination, reflection illumination or florescence.

The present invention permits the creation of a series of discrete, obliquely angled images at particular locations throughout the object. Such a series of images can be digitized and analyzed by a computer program that will create an accurate three-dimensional model of the object that can be viewed and measured from any angle. Thus, the invention, when combined with an optical viewing system, constitutes the hardware portion of a tomographic microscope.

It is an object of the present invention to create a 3-D image of an object in an optical system without the use of viewing aides, such as special spectacles or the like.

It is an object of the present invention to create a viewable 3-D image of an object in an optical system by creating motion parallax.

It is another object of the invention to create motion parallax in an optical system for creating a 3-D image of an object by continuously changing the portion of an objective aperture through which light passes.

A further object of the present invention is to create a series of images of an object that can be digitized and analyzed by a computer program that will create an accurate three-dimensional model of the object that can be viewed and measured from any angle.

Other advantages and objects of the invention will be apparent to those skilled in the art from the description of the invention which follows with reference to the following drawings.

BRIEF DESCRIPTION OF THE DRAWINGS

FIG. 1 is a typical lens aperture;

FIG. 1a is a schematic side view illustration of a typical condenser lens;

FIG. 2 is a mask of the present invention at the aperture;

FIG. 2a is the lens of FIG. 1a with the mask of FIG. 2 disposed at the aperture;

FIG. 3 is another mask of the present invention at the lens aperture;

FIG. 3a is the lens of FIG. 1a with the mask of FIG. 3 disposed at the aperture;

FIG. 4 is another mask of the present invention at the lens aperture;

FIG. 4a is the lens of FIG. 1a with the mask of FIG. 4 disposed at the aperture;

FIG. 5 illustrates the mask of FIG. 4 at different phases of its rotation;

FIG. 5a is an embodiment of a mask of the present invention formed from an LED matrix;

FIG. 6 is a side view of a typical prior art microscope;

FIG. 7 is an embodiment of the present invention utilizing an off-axis iris diaphragm;

FIG. 8 is a side view of a lens having a gear-driven dynamic aperture mask of the present invention at its objective aperture;

FIG. 8a is a plan view of the mask of the present invention shown in FIG. 8;

FIG. 9 is a side view of an embodiment of the present invention using a turret carrying multiple masks of the present invention;

FIG. 9a is a plan view of the turret and masks of FIG. 9;

FIG. 9b is the same as FIG. 9a, except that the masks have a different shape;

FIG. 10 is an embodiment of the present invention employing a slider on which multiple masks of the present invention are carried;

FIG. 11 is a side schematic view of an embodiment of the present invention incorporated in a phototube eyepiece for use with a camera;

FIG. 12 is a side schematic view of the present invention embodied in a light source;

FIG. 12a is a plan view of the dynamic aperture mask of the present invention of FIG. 12;

FIG. 13a is an illustration of the dynamic aperture mask of the present invention relative to a low NA objective;

FIG. 13b is an illustration of the dynamic aperture mask of the present invention relative to a medium NA objective;

FIG. 13c is an illustration of the dynamic aperture mask of the present invention relative to a high NA objective;

FIG. 14a is an embodiment of a dynamic mask of the present invention utilizing overlapping semi-circle opaque members;

FIG. 14b is a view of FIG. 14a with the members rotated to a different relative position;

FIG. 15 is an illustration of the dynamic aperture mask of the present invention in which the change in position of the light passing through the aperture is linear;

FIG. 15a is a diagrammatic illustration of an image of an object illustrated as shown in FIG. 15;

FIG. 16 is a side schematic illustration of an embodiment of the present invention utilizing a motor-driven optical fiber light source;

FIG. 17 is another side view schematic of another embodiment of the present invention utilizing a fiber optic light source;

FIG. 18 is another side view schematic of the present invention utilizing a fiber optic light source;

FIG. 19 is a schematic side view of an object viewed with the present invention illustrating the movement of the elements of the object as perceived through a microscope utilizing the present invention;

FIG. 20 is a schematic illustration of the present invention embodied in an endoscope;

FIG. 21 is an illustration of the present invention utilizing overlapping sector-shaped blades;

FIG. 21a shows the blades of FIG. 21 extended to obscure a greater portion of the aperture at which it is placed;

FIG. 22 is a schematic illustration of an embodiment of the invention utilizing expanding bellows;

FIG. 23a is an illustration of the present invention utilizing sector-shaped LCDs;

FIG. 23b is FIG. 23a with certain of the LCDs rendered opaque;

FIG. 23c is yet another illustration of FIG. 23a with other LCDs rendered opaque;

FIG. 24 is an illustration of the present invention utilizing an array of LEDs.

DETAILED DESCRIPTION OF THE INVENTION

The invention resides in methods and apparatus for continually changing the portion of an objective aperture in an imaging optical system that passes light so that the object is continually being viewed from a changing angle, permitting the elements of the image of the object in the foreground to be distinguishable from the elements of the image of the object in the background. Several structural embodiments of the invention achieve this result.

Referring to FIGS. 1 and 1a, a typical microscope condenser lens 11 has an aperture 12 defining an area 13. A light beam 14 entering the condenser 11 passes through the aperture 12 and emerges along the optical axis 16. There being no occlusion of the aperture 12, its entire area 13 is typically filled with the light beam 14.

Referring to FIGS. 2 and 2a, a mask 17 having an opaque sector 18 and a sector-shaped mask aperture 18a which can pass light is disposed at the lens aperture 12. A light beam 15 entering the lens 11 passes through the mask aperture 18a (which is the three-quarters of the lens aperture 12 not occluded by the sector 18) and emerges from the lens at an angle Ø to the optical axis 16. The beam 15 emerges from lens 11 as an oblique beam (relative to the optical axis 16) and the angle Ø is a measure of the obliquity of the beam.

Referring to FIGS. 3 and 3a, a mask 19 having an opaque sector 22 and a semi-circular mask aperture 22a which can pass light is disposed at the lens aperture 12 occluding one-half of the area of the aperture 12. A light beam 21 entering lens 11 passes through the half of lens aperture 12 aligned with mask aperture 22a and emerges from the lens 11 at an oblique angle Ø.

Referring to FIGS. 4 and 4a, a mask 23 having an opaque sector 26 and a sector-shaped mask aperture 26a is disposed at lens aperture 12, three-quarters of which it occludes. A light beam 24 entering lens 11 passes through only the mask aperture 26a and emerges from the lens 11 at an angle Ø to the optical axis 16. As the opaque area of the mask increases (the mask aperture area decreases), the beam angle Ø increases. Stated somewhat differently, as the area of the mask aperture decreases, so does the cone angle of the beam that emerges from the lens as measured at the focal plane 28 of the lens.

For each of the embodiments of FIGS. 2a–4a, an object 27 at an image (focal) plane 28 is illuminated with oblique illumination, and thus, ultimately viewed from an angle relative to the optical axis 16.

When it is stated that a mask or other element is located "at" an objective aperture, it shall mean, and will be understood by those skilled in the art, that the mask or other element is at that proximity to the objective aperture that an image of the mask or other element does not appear at an image plane in the optical system.

By rotating any of masks 17, 19 or 23, the portion of the lens aperture 12 which passes light is continually changed. As the mask rotates, beam 24, for example (FIG. 4a), will rotate about optical axis 16 so that the view of the image of object 27 will be from a continually changing angle, allowing the observer to interrogate the object through 360 degrees. By way of contrast, stereo 3-D viewing only allows the observer to view the object from two angles—a left angle and a right angle.

As used herein, the term "dynamic aperture mask" means a mask having an aperture located at an objective aperture which continuously allows light to pass, but limits the area of the objective aperture through which light passes to only an off axis portion of the objective aperture, and means that continuously rotates the mask through multiple rotations, which causes the portion of the objective aperture that passes light to continuously change and thereby continuously change the angle of illumination and thereby create motion parallax.

Referring also to FIG. 5, the rotation of mask 23 about optical axis 16 constantly moves the mask aperture 26 relative to the objective aperture 12 and continuously changes the portion of objective aperture 12 that passes light.

When a dynamic aperture mask, such as mask 23, is located at an objective aperture in an optical system illumination path, the object will be illuminated with oblique illumination and viewed from a continually changing angle as the mask rotates. When the object is illuminated with oblique illumination in this way, the image of the object will be enhanced in a manner taught by Greenberg U.S. Pat. No. 5,345,333.

When a dynamic aperture mask, such as mask 23, is disposed at an objective aperture in the optical system image path (i.e., after the object has been illuminated), the image of the object will also be viewed from a continually changing angle, and thus seen in 3-D, but will not have the enhanced effects of oblique illumination.

While the embodiment of the invention described above teaches the use of a dynamic aperture in the shape of a sector of a circle with the vertex of the sector at the optical axis, the invention is not so limited. The invention resides in continually changing the portion of the objective aperture through which light passes so that the angle from which the object is viewed is continually changed. This is also accomplished by continuously moving a shaped beam through different portions of the aperture. An LED array at the aperture plane that is controlled (turned on or off) in a way that simulates a light source continuously moving through a different portion of the objective aperture also serves the purpose of the invention to achieve its objects.

Referring to FIG. 5a, an array 30 of light-emitting diodes (LEDs) 32 is located at an objective aperture 29. The diodes 32 are controlled by control (switching) system 31 to create light patterns and sequences that continuously change the portion of the objective aperture (condenser aperture) through which light is emitted. The array 30 can be controlled to produce a sector-shaped light pattern that rotates about the optical axis of the aperture 29 or any other beam that can be moved continuously to create motion parallax.

Referring to FIG. 6, a typical optical system using Köhler illumination for imaging an object is a microscope 41 having an objective lens 42 with an objective lens aperture 43, and a condenser lens 44 having an aperture 46 which is conjugate to the objective lens aperture 43, and according to the definition used here, an objective aperture. Other objective apertures occur in the microscope at light sources 47 and 48, as well as at the eye-point 49 of phototube 50 and the eye-point 51 of eyepiece 55. Another objective aperture 52 is located in the optical system through relay lenses (not shown). As referred to herein, an "eye-point" is the location where a viewer's eye would be located to view the image of the object 53. Because an observer's eye has a focusing lens, the image is not in focus at the eye-point. The eye-point is one of the apertures conjugate to the objective aperture where the image is not in focus.

Placing a dynamic aperture mask, such as mask 23 (FIG. 4), at any of the objective apertures 43, 46, 47, 48, 49, 51 or 52 of the microscope 41 will create a viewable moving 3-D image of an object 53 in the otherwise 2-D microscope 41.

Microscope 41 operates as a transmitted light microscope when the object 53 is illuminated by light source 54. By placing dynamic aperture 23 at object plane 46 or 48 (in the illumination path), the object 53 is illuminated with oblique illumination that continually changes its angle, whereby the angle from which the image of the object 53 is viewed at eyepiece 55 is continually changing, giving the image the appearance of moving in three-dimensional space. Placing a dynamic aperture, such as mask 23 (FIG. 4), at any objective aperture 43, 49 or 51 (in the viewing path) of microscope 41 will cause the image of the object 53 to be perceived as moving through three-dimensional space and, thus, appearing as 3-D, even though not illuminated by oblique illumination.

It will be readily apparent to those skilled in the art that by substituting a standard condenser with a condenser 44 having a dynamic aperture mask, such as that shown in FIG. 4, at objective aperture 46, a microscope capable of only generating and viewing a two-dimensional image can be economically converted to a microscope that can create and view an image in real-time 3-D without filters or special glasses. The insertion of such a dynamic aperture at objective aperture 52, or any of the other microscope objective apertures, will likewise convert a microscope limited to 2-D into a microscope capable of viewing an object in 3-D (even if the microscope has only a monocular viewing system).

The benefits of the present invention can be realized utilizing various configurations of parts creating dynamic mask apertures of various geometric shapes and sizes. The particular physical embodiment or size and shape selected for a mask and its dynamic aperture will depend on a number of factors, including the effect that is desired and the characteristics of the object under examination. Thus, while particular shapes for a dynamic mask aperture may be more advantageous than others in certain circumstances, all shapes and sizes of dynamic apertures and all physical embodiments that create motion parallax and a 3-D image are within the teachings of the invention. Similarly, which of the several objective apertures in an optical imaging system where a mask (dynamic aperture) of the present invention is located is a matter of choice dependant on the circumstances of the investigation.

For example, placing the dynamic aperture at the condenser lens aperture is good for transmitting light applications, while placing it in the illumination system is good for both transmitted and reflected light applications. Placement at the illumination system has the added advantage of allowing for special optical systems, such as phase contrast optics. Additionally, placing the dynamic aperture at the photo eyepiece makes it compatible with florescence microscope.

Referring to FIG. 7, in one embodiment of the invention, a standard iris diaphragm 58 having an opening 59 which is variable in size, as indicated by dashed lined 61, is held within a circular frame 62 by springs 63 and 64 and positioning screws 66 and 67. The location of the iris opening 59 within the frame 62 is controlled by screws 66 and 67. When the frame-held iris 58 is positioned to locate the opening 59 off the center of an objective aperture 68, rotation of the frame 62, together with the diaphragm iris 58, causes the opening 59 to rotate within the aperture 68 and continuously change the portion of the aperture 68 that passes light. Frame 62 can be rotated by any one of several well known drive systems, including friction, belt, or gear drive.

Referring to FIGS. 8 and 8a, a lens 71 has a dynamic aperture mask 72 with a sector-shaped aperture 73 located at the lens objective aperture 70. Gear teeth 74 on the periphery of the dynamic aperture mask 72 mesh with a gear 76, which is rotated by a shaft 77, which is connected to a motor 78 or other means for rotating the shaft. As the gear 76 drives the dynamic aperture mask 74, the mask aperture 73 continuously changes the portion of the objective aperture 70 that passes light, thus producing the motion parallax which produces a 3-D effect.

Referring to FIGS. 9 and 9a, instead of locating a single dynamic aperture mask, such as mask 72 (FIG. 8), at the objective aperture of a lens, in this embodiment of the invention, a rotating turret 81 is disposed in the plane of the objective aperture 80 of a lens 82. The turret 81 carries four different dynamic aperture masks 83, 84, 86 and 87, each having an aperture 83a, 84a, 86a and 87a, respectively, of a different geometric shape. The particular shapes illustrated are only by way of example of the possible shapes for mask apertures that are within the scope of the invention. A standard iris diaphragm 88 can also be provided on the turret 81 for standard operation of the lens.

A drive gear 89, driven by a gear motor and shaft 91, engages the perimeter 92 of turret 81, enabling the turret 81 to be rotated about its axis 93. The drive gear 89 can thus position the turret 81 to align any of the masks 83, 84, 86, 87 or iris 88 with the aperture 80 of lens 82, as desired. Positioning turret 81 by hand is, of course, also an option. The alignment of a dynamic aperture mask with the objective aperture 80 of lens 82 also aligns the aperture mask with an aperture mask drive gear 94 for rotating the aligned mask. This embodiment permits the easy selection of one of a variety of different dynamic aperture masks for use as the need arises. The shape of each dynamic aperture can be designed for specific applications, such as phase contrast microscopy. Referring to FIG. 9b, a mask 95 on turret carrier 81 has an aperture 95a in the shape of a portion of a phase annulus. By rotating the phase annulus aperture 95a, 3-D phase contrast effects are achieved. The other masks illustrated provide apertures for use with different NA lenses and different shaped annuli.

Referring to FIG. 10, in another embodiment of the invention, a slide carrier 96 carries three rotatable dynamic aperture masks 97, 98 and 99, each having an aperture 97a, 98a and 99a, respectively, of a different geometric shape and each rotated by a belt 101 driven by a gear 102. Once again, the particular shapes illustrated are only a sample of the many different shapes that could be used. When the slide 96 is moved relative to a lens aperture (such as objective aperture 80 of FIG. 9), one of the dynamic aperture masks 97, 98 or 99 can be brought into alignment with the objective aperture and the optical axis of the optical system. Rotation of the mask will continuously change the portion of the objective aperture through which light passes, and thus produce the motion parallax which produces the 3-D effect of the present invention. A conventional iris diaphragm 103 can be conveniently located on the carrier 96, as well, for conventional use of the optical imaging system with which the carrier 96 is used.

Referring to FIG. 11, the present invention is embodied in an adapter for a microscope phototube. An adapter 106 contains a photo eyepiece 107 exclusively used to focus a light beam at an eye-point 108, which is coincident with an objective aperture 109. Light beam 105 carries an image of an object (not shown) that is "seen" at an image plane 111 in a camera 112 that is supported on the adapter 106 by a camera connector 113. Camera 112 can be a digital camera, a video camera or any other device capable of recording images.

A dynamic aperture mask 114 is located at the objective aperture 109 and rotated by a gear 116, supported on a shaft 117, driven by a motor 118. Dynamic aperture mask 114 can include an aperture of any desired shape, such as those illustrated in FIGS. 9a and 10, so long as when the aperture mask 114 is rotated by gear 116, the portion of the aperture 109 that passes light is continually changed whereby the image "seen" at image plane 111 of camera 112 is from a continuously changing angle.

By replacing a standard phototube with the phototube 106 of the present invention, a microscope capable of only creating and capturing a 2-D image can be easily converted into a microscope that can capture a 3-D image. One of the advantages of this embodiment of the invention is that it is compatible with all forms of microscopy, such as phase contrast, differential interference contrast, florescence, transmitted or reflected light microscopy.

Another embodiment of the present invention that conveniently and economically converts a 2-D microscope into a 3-D microscope is seen in FIGS. 12 and 12a. A lamp housing 121 having a dovetail mounting connector 122 that permits it to attach to a standard microscope lamp housing contains a lamp light source 123 and a lamp condenser lens 124. The light source 123 directs a light beam 125 onto a diffusing filter 126 from which the light beam is directed onto lamp condenser lens 124, and from there, into the optical path of a microscope (not shown).

The lamp condenser lens 124 creates an objective aperture 127, at which is located a dynamic aperture mask 128 having a sector-shaped aperture 129 which sweeps through the objective aperture 127 when driven by a gear 131 mounted on a shaft 132 rotated by a motor 133. Once again, as the mask aperture 129 rotates, the portion of the objective aperture 127 that passes light beam 125 is continually changed so that an object illuminated by the light beam 125 in a microscope optical system will be continuously illuminated from a changing angle and thus be perceived in 3-D by virtue of the motion parallax created by light beam 125. An advantage of this embodiment of the invention is that it works with phase contrast optics by continuously illuminating a different portion of a standard phase contrast annulus, regardless of the size of the phase annuli.

Referring to FIGS. 13a, 13b and 13c, one of the advantages of the embodiment of the present invention that utilizes a sector-shaped aperture 136 in an aperture mask 137 is that it operates equally with an objective of low numerical aperture (NA), as well as an objective with a high NA.

Thus, while the mask 137 is substantially larger than the low NA objective 138, rotation of the mask 137 nonetheless continuously changes the portion of objective 138 through which light can pass. Although the mask 137 stays the same in size, its ability to produce effective motion parallax by rotating at the mask aperture 136 of a medium NA objective 139 (FIG. 13b) or a high NA objective 141 (FIG. 13c) remains the same. Thus, in terms of what an objective aperture "sees," mask 137 is properly sized for a wide range of NA lenses. One shape fits many different size objective lenses with equal effect.

Referring to FIGS. 14a and 14b, another embodiment of the invention provides a rotatable dynamic aperture mask where the aperture is a sector of a circle which is variable in size. A dynamic aperture mask 144 includes a support ring 146 containing two semi-circular opaque aperture-forming members 147 and 148 which are rotatable within ring 146 about a center point 149. By overlapping a portion of the members 147 and 148, an aperture 151 is created which can pass light. Gears 152 on the outer circumference of the ring 146 mesh with a drive gear 153 for rotating the entire dynamic aperture mask 144. The size of aperture 151 is varied by rotation of the opaque members 147 and 148 relative to one another until the size of the aperture 151 best suits the needs of the investigation being conducted. As the aperture 151 increases in size, the illumination or viewing affected by the dynamic aperture decreases in apparent movement and vice versa. As the aperture 151 is decreased in size, the contrast and depth of field is increased.

A number of other mechanical and electro-mechanical devices are capable of creating a variable-size aperture in a dynamic mask, such as mask 144. Details of such other mask configurations are set forth in my copending application Ser. No. 09/715,636, for Method and Apparatus for Creating Real-Time 3-D Images and Constructing 3-D Models of an Object Imaged in an Optical System, filed Nov. 17, 2000. In particular, instead of overlapping opaque semi-circular members 147 and 148, the space within ring 146 could contain overlapping blade structures, such as shown in FIGS. 21 and 21a, which can be adjusted to create a variable-size aperture 151. Referring to FIG. 22, a bellow-type expandable opaque mask 150 can also create a variable-size aperture 151. Similarly, liquid crystal diodes (LCDs), such as shown in FIGS. 23a, 23b and 23c, can be used to create a variable light-passing aperture 151 within ring 146. FIG. 23a illustrates a circle formed by eight equal sector-shaped LCDs 154, all conditioned to pass light. In FIG. 23B, two adjacent LCDs 154 have been conditioned to be opaque to light so that the remaining LCDs form a sector-shaped aperture that passes light. FIG. 23C illustrates the LCDs 154 conditioned such that only two adjacent sectors pass light to create an aperture 151 different in shape than that of FIG. 23b. The particular variable-shaped rotatable aperture mask 144 illustrated in FIGS. 23A, 23b and 23c is but an example of the shaped that can be formed using LCDs. The advantage to using LCDs is that any shape can be achieved and quickly changed to any other shape, including shapes that would be difficult, if not impossible, to achieve with physical masks. In addition, the shapes and their transitions can be computer-created and controlled to create dynamic apertures tailored to specific needs. In addition to sector-shaped LCDs, a mask can be formed from an X-Y array of LCDs that can be switched to create any shape desired that can be moved continuously so that light can be caused to continuously move through a different portion of an objective aperture. See Kley U.S. Pat. No. 4,561,731.

Thus, in addition to the plurality of different-size apertures in a dynamic aperture mask, such as illustrated in FIGS. 9a and 10, the invention can also be embodied in a single mask having a variable-size aperture.

All of the embodiments of the invention disclosed so far include a rotating mask aperture at an objective aperture to continually change the portion of the objective aperture which passes light in order to create motion parallax and a 3-D view. The objects of the invention are achieved, however, by different forms of a dynamic aperture, as well as by a shaped beam in place of an aperture mask.

Referring to FIGS. 15 and 15a by moving a shaped light beam or an occluding mask back and forth across an objective aperture 156, the portion of the aperture which passes light is continually changed, as best seen by the progressive change in the portion of aperture 156 which passes light. As the light beam or occluding mask swings across the aperture 156 to one extreme of its travel light is passes through portion 156a of aperture 156. As it retreats from that extreme light passes through portion 156b until the entire aperture is filled with light when the beam is centered. As the beam is moved beyond center the portion 156d passes light and when the beam reached the extreme position in the other direct portion 156e passes light. As the beam swings back, the pattern is reversed. By occluding the aperture in this way, or by passing a shaped light beam over the aperture 156, each element 157 of an object being viewed (not shown) appears to rock back and forth, as indicated by motion arrows 158. The combined effect of the rocking motion of the elements of an object through the methods and apparatus of the present invention reveals the three-dimensional structure of the object similar to the three-dimensional view created by the rotating dynamic aperture mask described above.

One of the advantages in using a rotating sector of a circle or other geometric shape rotating about the center of the objective aperture to continually change the portion of the aperture which passes light is that the intensity of the light passed by the aperture remains constant, whereas in the embodiment of FIGS. 15 and 15a, the light intensity varies considerably. This darkening and lightening effect can be overcome or ameliorated by a feedback system that continually changes the intensity of the light source to effect an evenly illuminated image.

Referring to FIG. 16, one way to achieve the variable occlusion of the objective aperture shown in FIG. 15 is by causing a fiber optic bundle 161 illuminated by a light source 160 to reciprocate relative to a lens 162 and its objective aperture 163. A reciprocating motor 164 and connecting link 166 cause the fiber optic bundle 161 to move back and forth a distance sufficient to move a light beam 167 from the fiber optic bundle 161 across the lens 162 so that, except when the fiber optic bundle is centered, some portion of the objective aperture 163 is not illuminated by the light beam 167, as illustrated in FIG. 15. The numbers 156a, 156c and 156e indicate the positions of bundle 161 that create the aperture portions that pass light of the same numerical designations in FIG. 15.

Referring to FIG. 17, a fiber optic bundle 169 receiving light from a light source 171 produces a beam 172 having a cross-section substantially smaller than the objective aperture 173 of a lens 174 onto which the beam is directed. A motor 176 connected to the fiber optic bundle 169 by a link 177 causes the fiber optic bundle to move in a circle, as indicated by motion arrow 178. As beam 172 rotates, the portion of aperture 173 that contains light continually changes, producing substantially the same effect as described in connection with the dynamic aperture mask embodiment of the invention. (See particularly FIG. 7.) As with a dynamic mask, motion parallax is created, giving rise to a 3-D effect. In the shaped light beam embodiment of the invention, the intensity of the light that passes through the aperture 173 is essentially constant.

Referring to FIG. 18, a light source 181 directs a beam of light 182 onto a mirror 183, which reflects the light beam onto a lens 184 through the objective aperture 186. A motor 187 connected to mirror 183 through a link 188 causes mirror 183 to move in such a way as to sweep beam 182 across the aperture 186 so as to create the variable occlusion illustrated in FIG. 15.

Another way of creating a shaped light beam is to use an array of light emitting diodes (LEDs) at an objective aperture. Referring to FIG. 24, an array 179 of LEDs 180 can be controlled to emit light in any pattern desired. Moreover, the selected shape can be caused to move so that when placed at an objective aperture, light will pass through a different portion of the aperture on a continuous basis. The dark shaded diodes 179 form a sector 179a and represent diodes that are emitting light. That sector can be caused to rotate, creating the same result as the dynamic aperture mask of FIG. 4, for example.

One application of the present invention is to create a series of discrete obliquely angled images of an object at selected planes throughout the object. The series of images so created can be digitized and analyzed by a computer program to create a very accurate three-dimensional model of the object that can be viewed and measured from any angle. Thus, the present invention can be combined with an ordinary microscope to create the hardware portion of a tomographic microscope.

Referring to FIG. 19, an object 191 consists of a plurality of object-forming elements 191a, 191b, 191c, 191d, 191e, 191f, 191g and 191x. The ran object 191 is being imaged by an optical imaging system, such as a microscope, having an optical axis parallel to axes 193 and a focal plane at 194 within the object 191. When the object 191 is viewed in an optical viewing system that includes an objective aperture through which a light beam continuously passes through a different portion, as taught by the present invention, the various elements of object 191, other than those which are at the image plane 194, precess about optical axis 193 in circles that increase in diameter as the distance of the element from the image plane 194 increases. Thus, for example, element 191a will move in a larger circle about axis 193 than element 191b, which is closer to the image plane 194. Element 191c, which is at the image plane, will not move at all, whereas element 191d, which is about the same distance from the image plane 194 as element 191b, will circle the optical axis 193 in a circle of about the same diameter as the circle traveled by element 191b, but be in an opposite phase thereto. Each element of the object 191 that is off the optical axis 194, such as elements 191f and 191x, will precess about an axis 193. The combined effect of the apparent movement of the various elements of the object 191, as seen in an optical system employing the present invention, is that the entire object 191 appears to move in three-dimensional space so as to make it possible to discern those elements of the object which are in the foreground from those which are in the background and thus appear in 3-D.

Because all of the elements of the object 191 that are off of the image plane 194 move with time, it is possible, using known digitizing and computer programming techniques, to eliminate from an image of object 191 all of the elements, other than those that appear at the image plane, by eliminating all elements that change location with time. In this way, it becomes possible to create an image of the object at a selected plane in the object, such as plane 194. By moving the image plane to various locations within object 191 (by, for example, refocusing the microscope), it becomes possible to create a series of focal plane specific images of object 191, and from that series of images, create an accurate model of the object 191 that can be viewed and measured from any angle.

Referring to FIG. 20, the dynamic aperture system of the present invention can be used advantageously with imaging techniques, such as endoscopy.

As is typical in endoscopy, a slender fiber optic tube 201 is inserted into a body 202 for the purpose of viewing interior portions of the body 202 through a lens 203 in the distal end of the fiber optic tube 201. The images created by the lens 203 are directed to a camera 204 where they are recorded or displayed in real-time by a monitor 206. One of the difficulties in dealing with endoscopic images is that they lack three-dimensional perspective making it difficult to determine the spacial relationship of the various images being viewed.

The present invention provides a means for giving three-dimensional perspective to the endoscopic images. A lens 207 between the camera 204 and the endoscopic tube 201 creates an objective aperture 208 outside of the body 202 where it is convenient to locate a dynamic aperture mask 209 of the present invention which can be driven by a motor 211, as previously described.

It will be obvious to those skilled in the art that the dynamic aperture 209 can be any of the various embodiments of the invention described therein, as well as those which are equivalent thereto, and will not depart from the invention. In an endoscope, as in any imaging system that has or is capable of having an objective aperture, the present invention provides a means for creating motion parallax from otherwise two-dimensional images so as to create a three-dimensional perspective.

Obviously, many modifications and variations of the present invention are possible in light of the above teachings. It will, therefore, be understood by those skilled in the art that within the scope of the appended claims, the invention may be practiced otherwise than as specifically described.

What is claimed:

1. In an optical system for viewing an object illuminated by a light beam and having an objective aperture through which the light beam passes, the improvement comprising:
   rotatable means permitting the continuous passage of light through the objective aperture, but limiting the light beam to passing through only a portion of the objective aperture; and
   means for continuously rotating said rotatable means a plurality of revolutions to continuously change the portion of the objective aperture through which light passes while the object is being viewed.

2. The improvement of claim 1 wherein the optical system is further described as having a viewing path and the objective aperture is in the viewing path.

3. The improvement of claim 2 wherein the viewing path is further described as including an eye point and the objective aperture is between the eye point and the object.

4. The improvement of claim 2 wherein the viewing path is further described as including an eye point and the objective aperture is at the eye point.

5. The improvement of claim 1 wherein the optical system is further described as having an illumination path and the objective aperture is in the illumination path.

6. The improvement of claim 5 wherein the illumination path is further described as including a light source and the objective aperture is between the light source and the object.

7. In an optical system for viewing an object and having an objective aperture with an axis through which light passes, the improvement comprising:
   a dynamic aperture mask disposed at the objective aperture;
   a dynamic aperture mask having an aperture located at the objective aperture which continuously allows light to pass, but limits the area of the objective aperture through which light passes to only an off axis portion of the objective aperture; and
   means for continuously rotating the mask through multiple rotations, which causes the portion of the objective aperture that passes light to continuously rotate about the objective aperture axis and thereby continuously change the angle of illumination and thereby create motion parallax.

8. The improvement of claim 7 wherein said dynamic aperture mask is an array of LCDs.

9. The improvement of claim 7 wherein said dynamic aperture mask is an opaque disk with a sector-shaped aperture.

10. The improvement of claim 7 wherein said dynamic aperture mask is overlapping leaflets.

11. The improvement of claim 7 wherein said dynamic aperture mask is two overlapping semi-circular opaque discs.

12. The improvement of claim 7 wherein said dynamic aperture mask is a plurality of sector-shaped LCDs.

13. The improvement of claim 7 wherein said dynamic aperture mask has a variable size aperture.

14. The improvement of claim 13 wherein said variable size aperture is an iris diaphragm disposed off the objective aperture axis.

15. The improvement of claim 7 wherein the aperture in said dynamic aperture mask has the shape of a sector of a phase annulus.

16. In an optical system for viewing an object and having an objective aperture through which light passes, the improvement comprising:
   a carrier disposed at the objective aperture and moveable relative thereto;
   a plurality of dynamic aperture masks on said carrier each of which can be aligned with the objective aperture by moving said carrier relative thereto wherein each said dynamic aperture mask comprises:
   an aperture located at the objective aperture which continuously allows light to pass, but limits the area of the objective aperture through which light passes to only an off axis portion of the objective aperture; and means that continuously rotates the mask through multiple rotations, which causes the portion of the objective aperture that passes light to continuously change and thereby continuously change the angle of illumination and thereby create motion parallax.

17. The improvement of claim 16 wherein the apertures of said dynamic aperture masks are sectors of circles of different sizes.

18. The improvement of claim 16 wherein the apertures of said dynamic aperture masks are sectors of phase annuli of different sizes.

19. In a method for creating a 3-D view of an object in an imaging system having an objective aperture with an axis through which a light beam passes, the steps comprising:
   causing the light beam to pass through only a portion of the objective aperture; and
   continuously moving the light beam about the objective aperture axis within the objective aperture to create motion parallax whereby the object is viewed in 3-D.

20. The method of claim 19 wherein a dynamic aperture mask is used to cause the light to pass through only a portion of the objective aperture and rotate about the objective aperture axis wherein said dynamic aperture mask comprises an aperture located at the objective aperture which continuously allows light to pass, but limits the area of the objective aperture through which light passes to only an off axis portion of the objective aperture; and means for continuously rotating the mask through multiple rotations, which causes the portion of the objective aperture that passes light to continuously change and thereby continuously change the angle of illumination and thereby create motion parallax.

21. The method of claim 19 wherein an array of LCDs is used to cause the light to pass through only a portion of the objective aperture.

22. The method of claim 19 wherein an array of LEDs is used to cause the light to pass through only a portion of the objective aperture.

23. The method of claim 19 wherein a shaped beam is used to cause the light to pass through only a portion of the objective aperture.

24. The method of claim 19 wherein the imaging system is a light microscope having an illumination path including the objective aperture and a viewing path having at least one additional objective aperture wherein the objective aperture through which light passes through only a portion is in the illumination path.

25. The method of claim 19 wherein the imaging system is a light microscope having an illumination path including the objective aperture and a viewing path having at least one additional objective aperture wherein the objective aperture through which light passes through only a portion is in the viewing path.

26. The method of claim 19 wherein the imaging system is a light microscope having a light source wherein the objective aperture through which light passes through only a portion is in the light source.

27. The method of claim 26 wherein the microscope is a phase contrast microscope.

28. The method of claim 19 wherein the imaging system is a light microscope having a photo tube and the objective aperture through which light passes through only a portion is at the photo tube.

29. The method of claim 19 wherein the imaging system is a light microscope having an eye piece and the objective aperture through which light passes through only a portion is at the eye piece.

30. The method of claim 19 wherein the microscope is a phase contrast microscope.

31. In a phase contrast microscope having a light source with an objective aperture that has an axis and through which light is directed the improvement comprising:

dynamic aperture means permitting the continuous passage of light through the objective aperture, but limiting the light to passing through only an off axis portion of the objective aperture and;

means continuously rotating said dynamic aperture about the objective aperture axis multiple revolutions to create motion parallax.

32. In the phase contrast microscope of claim 31 where the dynamic aperture means is an aperture mask.

33. In a method of creating a three dimensional model of a three dimensional object having a plurality of elements using a light microscope having an objective aperture through which a light beam passes and a focal plane the steps comprising:

locating the microscope focal plane at various locations within the object;

for each location of the focal plane within the object:
cause the light beam that passes through the objective aperture to pass through only a portion of the objective aperture;
continuously change the portion of the objective aperture through which the light beam passes.

34. In a method of creating a three dimensional model of a three dimensional object having a plurality of elements using a light microscope having an objective aperture through which a light beam passes and a focal plane the steps comprising:

locating the microscope focal plane at various locations within the object;

for each location of the focal plane within the object:
cause the light beam that passes through the objective aperture to pass through only a portion of the objective aperture;
continuously change the portion of the objective aperture through which the light beam passes;
digitize the image of the object at each location;
eliminate from the digitized image all elements of the object that change location while the portion of the objective aperture through which the light beam passes is continuously changed thereby obtaining a focal plane specific image;

combine the focal plane specific images for each location of the focal plane within the object.

35. In an endoscopic device having an optical path for light that includes a probe and lens with an objective aperture for entering into a body to transmit a view of the interior thereof to a viewing system outside the body, the improvement comprising:

an objective aperture outside the body in the optical path between the lens and the viewing system; and means continuously changing the portion of said objective aperture outside the body that passes light.

36. The improvement of claim 35 wherein said means is a dynamic aperture mask disposed at said objective aperture.

37. The improvement of claim 36 wherein said dynamic aperture mask is an array of LCDs.

38. The improvement of claim 36 wherein said dynamic aperture mask is an expandable bellows.

39. The improvement of claim 36 wherein said dynamic aperture mask is overlapping leaflets.

40. The improvement of claim 36 wherein said dynamic aperture mask is two overlapping semi-circular opaque discs.

41. The improvement of claim 36 wherein said dynamic aperture mask is a plurality of sector-shaped LCDs.

42. The improvement of claim 36 wherein said dynamic aperture mask has a variable size aperture.

43. The improvement of claim 42 wherein said variable size aperture is sector shaped.

* * * * *